US010204217B2

United States Patent
Perez et al.

(10) Patent No.: US 10,204,217 B2
(45) Date of Patent: *Feb. 12, 2019

(54) SYSTEM AND METHOD FOR REPLACING COMMON IDENTIFYING DATA

(71) Applicant: ARP—IP LLC, Santa Barbara, CA (US)

(72) Inventors: Anthony R. Perez, Santa Barbara, CA (US); Justin Soenke, Goleta, CA (US)

(73) Assignee: ARP-IP LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,146

(22) Filed: Jun. 14, 2017

(65) Prior Publication Data

US 2017/0286666 A1 Oct. 5, 2017

Related U.S. Application Data

(63) Continuation of application No. 14/589,976, filed on Jan. 5, 2015, now Pat. No. 9,710,641.

(Continued)

(51) Int. Cl.
*G06F 21/45* (2013.01)
*G06F 21/36* (2013.01)
(Continued)

(52) U.S. Cl.
CPC ............ *G06F 21/45* (2013.01); *G06F 21/35* (2013.01); *G06F 21/36* (2013.01); *H04L 63/083* (2013.01); *H04L 63/0853* (2013.01)

(58) Field of Classification Search
CPC .......... G06F 21/45; G06F 21/35; G06F 21/36; H04L 63/083; H04L 63/0853
See application file for complete search history.

(56) References Cited

U.S. PATENT DOCUMENTS 5,559,961 A    9/1996   Blonder
5,841,978 A * 11/1998   Rhoads ............ G06F 17/30876
                                                           709/217

(Continued)

FOREIGN PATENT DOCUMENTS

CN        101309147 A    11/2008
JP       2014-078079 A    5/2014

(Continued)

OTHER PUBLICATIONS

Takada, Tetsuji, et al., Awase-E: Recognition-based Image Authentication Scheme Using User's Personal Photographs, IEEE, 2006, 5 pages.

(Continued)

*Primary Examiner* — Catherine B Thiaw
*Assistant Examiner* — Wayne An
(74) *Attorney, Agent, or Firm* — Lewis Roca Rothgerber Christie LLP

(57) ABSTRACT

A system and method for generating a unique identifier for a user. A processor hosted by the system transmits a prompt for user selection of a digital image and receives the selected digital image from the user. The received digital image is stored in a data storage device. The processor identifies a first code associated with the user. The processor embeds the first code into the digital image and generates a first modified digital image in response. The first modified digital image is also stored in the data storage device. The processor transmits the first modified digital image to the user over a data communications network. The modified digital image is then used as the unique identifier for the user.

16 Claims, 8 Drawing Sheets

Related U.S. Application Data

(60) Provisional application No. 62/091,453, filed on Dec. 12, 2014.

(51) Int. Cl.
*G06F 21/35* (2013.01)
*H04L 29/06* (2006.01)

(56) References Cited

U.S. PATENT DOCUMENTS

| | | | |
|---|---|---|---|
| 6,661,904 B1* | 12/2003 | Sasich | G06T 1/005 |
| | | | 375/E7.089 |
| 6,961,441 B1 | 11/2005 | Hershey et al. | |
| 7,047,562 B2 | 5/2006 | Peterson et al. | |
| 7,174,462 B2 | 2/2007 | Pering et al. | |
| 7,379,921 B1* | 5/2008 | Kiliccote | G06Q 20/401 |
| | | | 705/75 |
| 7,665,146 B2 | 2/2010 | Munje et al. | |
| 7,667,871 B1* | 2/2010 | Roskind | G06F 21/6254 |
| | | | 235/386 |
| 7,694,137 B2 | 4/2010 | Matsuya | |
| 8,489,889 B1 | 7/2013 | Moscaritolo et al. | |
| 8,626,665 B2 | 1/2014 | Bui | |
| 2001/0037468 A1 | 11/2001 | Gaddis | |
| 2004/0015479 A1 | 1/2004 | Meek et al. | |
| 2004/0034801 A1 | 2/2004 | Jaeger | |
| 2004/0057581 A1 | 3/2004 | Rhoads | |
| 2004/0213437 A1 | 10/2004 | Howard et al. | |
| 2007/0092102 A1 | 4/2007 | Kot et al. | |
| 2007/0216931 A1 | 9/2007 | Chiba et al. | |
| 2008/0168275 A1 | 7/2008 | De Atley et al. | |
| 2008/0235784 A1* | 9/2008 | Basner | G06F 21/36 |
| | | | 726/12 |
| 2008/0301820 A1 | 12/2008 | Stevens | |
| 2009/0018934 A1 | 1/2009 | Peng et al. | |
| 2009/0106362 A1 | 4/2009 | Kuhlke et al. | |
| 2010/0299747 A1 | 11/2010 | Hamilton et al. | |
| 2011/0072272 A1 | 3/2011 | Corbin et al. | |
| 2012/0144458 A1* | 6/2012 | Mechaley, Jr. | G06F 21/35 |
| | | | 726/5 |
| 2013/0091561 A1* | 4/2013 | Bruso | G06F 21/31 |
| | | | 726/16 |
| 2013/0124499 A1 | 5/2013 | Liau | |
| 2013/0167225 A1 | 6/2013 | Sanft et al. | |
| 2013/0308772 A1 | 11/2013 | Marchant | |
| 2014/0173707 A1* | 6/2014 | Hollander | H04L 63/10 |
| | | | 726/7 |
| 2014/0208447 A1 | 7/2014 | Berger | |
| 2014/0270336 A1 | 9/2014 | Eckel et al. | |
| 2015/0178521 A1* | 6/2015 | Ching | G06K 5/00 |
| | | | 235/375 |
| 2016/0210445 A1 | 7/2016 | Deaver | |

FOREIGN PATENT DOCUMENTS

| | | |
|---|---|---|
| JP | 5639226 B1 | 12/2014 |
| WO | 2008070894 A1 | 6/2008 |
| WO | WO 2014/172908 A1 | 10/2014 |

OTHER PUBLICATIONS

Pering, Trevor, et al., Photographic Authentication through Untrusted Terminals, CS and Communications Society, IEEE, 2003, 7 pages.
Smart Password Store, retrieved from http://www.rentasoft.com/userGuide.asp?id=3 via Wayback machine, published Oct. 26, 2007, 5 pages.
Time for New Passwords, retrieved from http://www.rockpapershotgun.com/2014/02/16/time-for-new-passwords-kickstarter-hacked/, published Feb. 16, 2014, 12 pages.
Xperia Series Blog, retrieved from http://xperiaseries.wordpress.com/2010/06/, published Jun. 2010, 8 pages.
Windows 8 Picture Password, retrieved from http://blogs.msdn.com/b/b8/archive/2011/12/16/signing-in-with-a-picture-password.aspx, published Dec. 16, 2011, 22 pages.
International Search Report and Written Opinion for PCT/US2015/064845, filed on Mar. 28, 2016, 15 pages.
Australian Examination Report for Application No. 2015360509, dated Jan. 11, 2018, 4 pages.
European Extended Search Report for Patent Application No. 15867616.3, dated Mar. 27, 2018, 6 pages.
Canadian Office action for Patent Application No. 2,970,338, dated Apr. 5, 2018, 3 pages.
Japanese Office action for Patent Application No. 2017-550083, dated Jun. 19, 2018, 5 pages.

* cited by examiner

```
<form name="loginform" action="performlogin.php" method="post">
    <input name="username" type="text" size="48">
    <input name="password" type="password" size="48">
    <input name="submit" type="submit" value="Submit">
</form>
```

Traditional User ID Field → (line 2)
Traditional Password Field → (line 3)

FIG. 5A
(Prior Art)

SYSTEM AND METHOD FOR REPLACING COMMON IDENTIFYING DATA

CROSS-REFERENCE TO RELATED APPLICATIONS

This application is a continuation of U.S. patent application Ser. No. 14/589,976, filed on Jan. 5, 2015, which claims the benefit of U.S. Provisional Application Ser. No. 62/091,453, filed on Dec. 12, 2014, the content of all of which are incorporated herein by reference.

BACKGROUND

One of the benefits of the World Wide Web is that it generally allows people to connect globally without substantial barriers. However, this has also led to lack of proper security for users communicating via the web. The lack of proper security exposes users to cyber-criminals, hackers, and others, who want to steal information from people using the web.

One attempt to provide protection against unauthorized access to data is to authenticate users prior to giving them access to such data. For example, users may be required to provide a password that only the user should know before allowing the access. However, users often store passwords or other authentication information in devices such as the user's computer, cell phone, or the like. In this case, cyber-criminals may hack the user's device and obtain the user's authentication information to impersonate the user and unlawfully access data.

Accordingly, what is desired is a system and method for authenticating users while limiting exposure to data used for authentication purposes.

SUMMARY

According to one embodiment, the present invention is directed to a system and method for generating a unique identifier for a user. The system includes a processor and memory where the memory stores instructions that, when executed by the processor, cause the processor to take the following actions. The processor transmits a prompt for user selection of a digital image and receives the selected digital image from the user. The received digital image is stored in a data storage device. The processor identifies a first code associated with the user. The processor embeds the first code into the digital image and generates a first modified digital image in response. The first modified digital image is also stored in the data storage device. The processor transmits the first modified digital image to the user over a data communications network.

According to one embodiment, the digital image is stored in an end user device accessible to the user.

According to one embodiment, the first code is personal information of the user. The personal information may be at least one of address, telephone number, birthdate, name, driver license number, social security number, credit card number, user identifier, or password.

According to one embodiment, the first code is a randomly generated code.

According to one embodiment, the processor further receives an alphanumeric string provided by the user, and encrypts the first code based on the alphanumeric string. According to this embodiment, the first code embedded into the digital image is the encrypted code.

According to one embodiment, the embedding includes identifying bits of the digital image that do not contribute in creating a visual depiction of the digital image.

According to one embodiment, the processor further receives a request including the first modified digital image, retrieves the embedded first code from the digital image, compares the retrieved first code against a stored version of the first code, and takes a success action associated with the first modified digital image in response to a match of the retrieved first code against the stored version of the first code.

According to one embodiment, the processor further receives a request including the first modified digital image, transmits a security code to a mobile telephone number associated with a user, and verifies the transmitted security code against a security code received from the mobile telephone number.

According to one embodiment, the processor identifies a second code associated with the user. The processor further embeds the second code into the digital image and generates a second modified digital image in response. The second modified digital image is stored in the data storage device. The processor transmits the second modified digital image to the user over a data communications network. According to this embodiment, a success action associated with the second modified digital image is different from the success action associated with the first modified digital image.

According to one embodiment, the success action includes transmitting an alert of a duress situation involving the user.

According to one embodiment, the processor receives an answer to a math problem provided by the user, and determines whether the answer is correct. In response to determining that the answer is incorrect, the processor takes a failure action.

According to one embodiment, the success action is retrieving account information of the user for an e-commerce transaction.

BRIEF DESCRIPTION OF THE DRAWINGS

FIG. 5A illustrates code for generating a typical HTML login form according to existing mechanisms;

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Embodiments of the present invention are directed to a system and method that generates and uses a unique ID for user authentication, identification, and/or the like (collectively referred to as authentication). The unique ID, as is used herein, is a digital image that contains an embedded code. The embedded code may be personal or sensitive data of a user, such as, for example, the user's name, birthdate, driver's license number, social security number, user ID, password, secret questions/answers, credit card numbers, phone numbers, and/or the like. In addition or in lieu of personal data, the embedded code may be random text and/or numbers automatically generated by the system and assigned to the user. Although embodiments of the present invention envision that the code embedded in the image is encrypted, non-encrypted codes may also be embedded. According to one embodiment, the code is stored in unused or insignificant bits of the digital image. The digital image may be generated using any one of many well-known image file formats conventional in the art, including but not limited to jpeg, tiff, gif, bmp, png, Netpbm, WebP, and the like.

According to one embodiment, a user provides the encoded image to a computer device to trigger a particular action. Such action may be, for example, authentication of the user for access or login to a network, computer, mobile device, electronic tablet, webpage, and/or the like (hereinafter "target site"). Once allowed into the target site, the user may access data, applications, and the like, stored at the target site. The level of access may depend on preset configuration settings on the computer device and/or target site. Another action triggered upon providing the code may be, for example, completion of a transaction. The transaction may be, for example, a purchase transaction with a particular merchant.

According to one embodiment, the computer device evaluating a received unique ID for purposes of user authentication is physically separate from a target device storing data/applications to which the user wants access. In this manner, the target device need not store codes or other authentication information for the user. Instead, such sensitive data is stored and managed by the separate device, and provided to the target device as needed after the user has been authenticated. Thus, even if a hacker penetrates the target site, codes or other authentication information for the user are not compromised.

Figure 1:
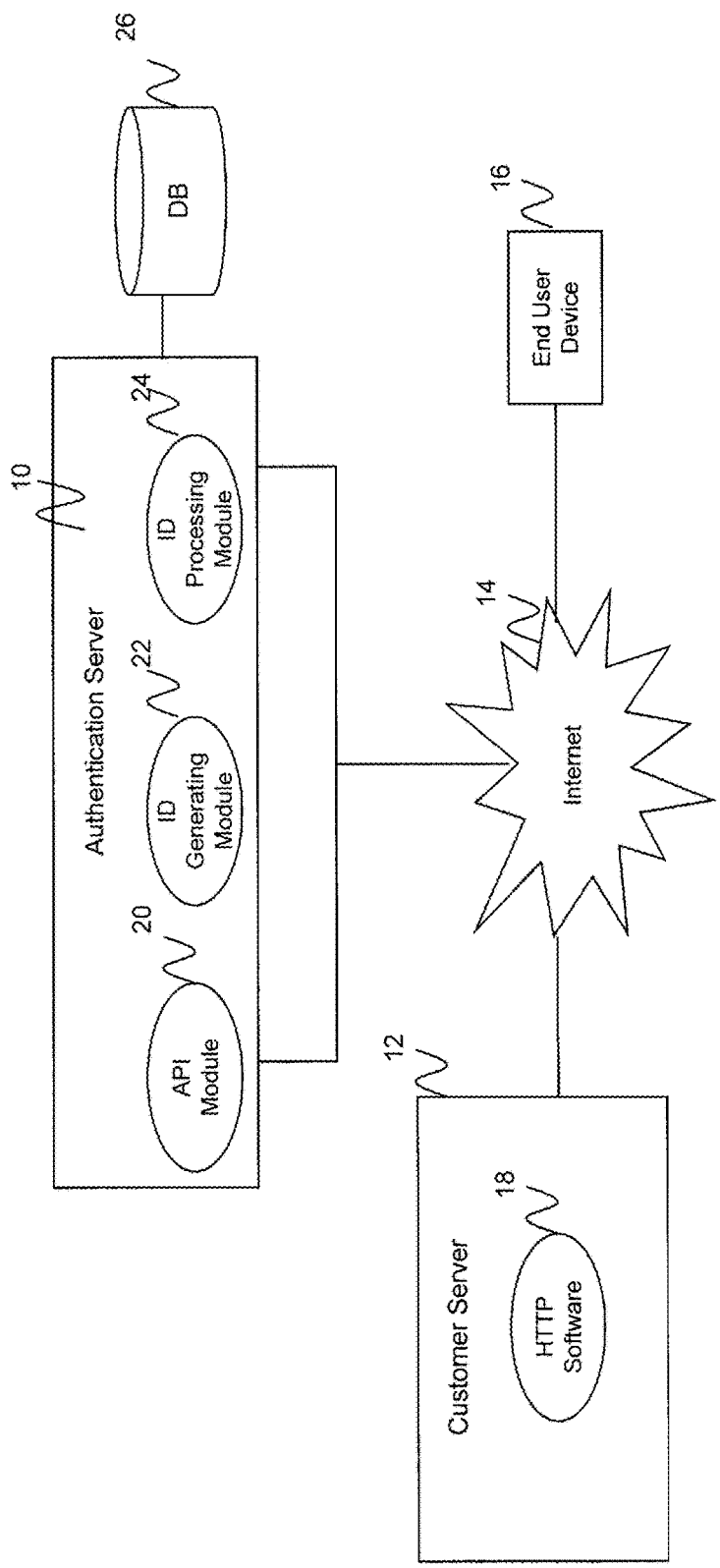
FIG. 1 is a schematic block diagram of a system for authenticating a user via a code encoded in a digital image according to one embodiment of the invention.

FIG. 1 is a schematic block diagram of a system for authenticating a user via a code encoded in a digital image according to one embodiment of the invention. The system includes an authentication server 10 coupled to a customer server 12 over a data communications network 14. According to one embodiment, the data communications network is a public wide area network such as the Internet.

The system also includes an end user device 16 configured to access the customer server 12 over the data communications network 14. The end user device 16 may be any computing device conventional in the art such as, for example, a desktop, laptop, smart phone, electronic tablet, and the like. The end user device includes one or more processors, memory, input devices (e.g. mouse and keyboard), output devices (e.g. one or more display screens), and a wired or wireless network interfaces. According to one embodiment, the end user device 16 also includes web browsing software for communicating with the customer server 12 over the web.

According to one embodiment, the customer server 12 is a web server provided by a business in a relationship with another business hosting the authentication server 10. The customer server 12 is configured with web server software 18 that communicates with the application program interface (API) module 20. The web server software 18 includes instructions for receiving HTTP requests from the end user device 16 and delivering web pages in response to the requests. A particular web page delivered to an end user device 16 may be a login form for giving the user access to resources provided by the customer server 12. The login form may include one or more fields where each field prompts the user for different user data. For example, one field may prompt the user for his login ID, another field may prompt the user for his social security number, and yet another field may prompt the user for his credit card number. The user invokes his end user device 16 to submit his unique ID having the corresponding code in response to each prompt. According to one embodiment, a different unique ID may be provided in response to each prompt.

The authentication server 10 includes a central processing unit (CPU) that executes software instructions and interacts with other system components to perform the methods of the present invention. The server 10 also includes a mass storage device 26 that provides long-term storage of data and software programs to perform the methods of the present invention. The mass storage device 26 may be implemented as a hard disk drive or other suitable mass storage device. The stored data may be, for example, image files to be used for authenticating one or more users, code embedded in each of the image files, and user data stored in association with a corresponding code. According to one embodiment, codes may be encrypted via an encryption algorithm prior to being stored in the storage device 26.

The server 10 further includes an addressable memory for storing software instructions to be executed by the CPU. The memory is implemented using a standard memory device, such as random access memory (RAM). In one embodiment, the memory stores a number of software objects or modules, including an API module 20, a unique ID generating module 22 and a unique ID processing module 24. Although these modules are assumed to be separate functional units, a person of skill in the art will recognize that the functionality of the modules may be combined or integrated into a single module, or further subdivided into further sub-modules without departing from the spirit of the invention.

According to one embodiment, the API module 20 includes instructions for forwarding the received unique ID(s) to the authentication server 10. In this regard, the API module 20 is an interface for communicating between the customer server 12 and the authentication server 10.

According to one embodiment, the ID generating module 22 includes instructions for receiving a digital image from the end user device 16, embedding code into the image, and outputting the image with the embedded code. According to one embodiment, instead of receiving the digital image from the end user device 16, the ID generating module may simply retrieve one of various available images from the mass storage device 26, and use that image for embedding the code. According to one embodiment, the code is encrypted using an encryption algorithm prior to being embedded into the image. The image containing the embedded code is then provided to the user for use as his unique identifier (unique ID).

The unique ID processing module 24 includes instructions for receiving an image file, having an embedded code, from a user desiring access to resources provided by the customer server 12. The unique ID processing module 24 is configured to extract the code from the image file, compare the extracted code against corresponding code stored in the storage device 26, and execute an action in response to the match. The action may be, for example, serving a particular web page to the end user device 16, effectuating a transaction, invoking an application, initiating communication with another device, retrieving and forwarding to the customer server 12 data associated with the user, and/or authorizing access to other resources provided by the customer server 12.

Figure 2:
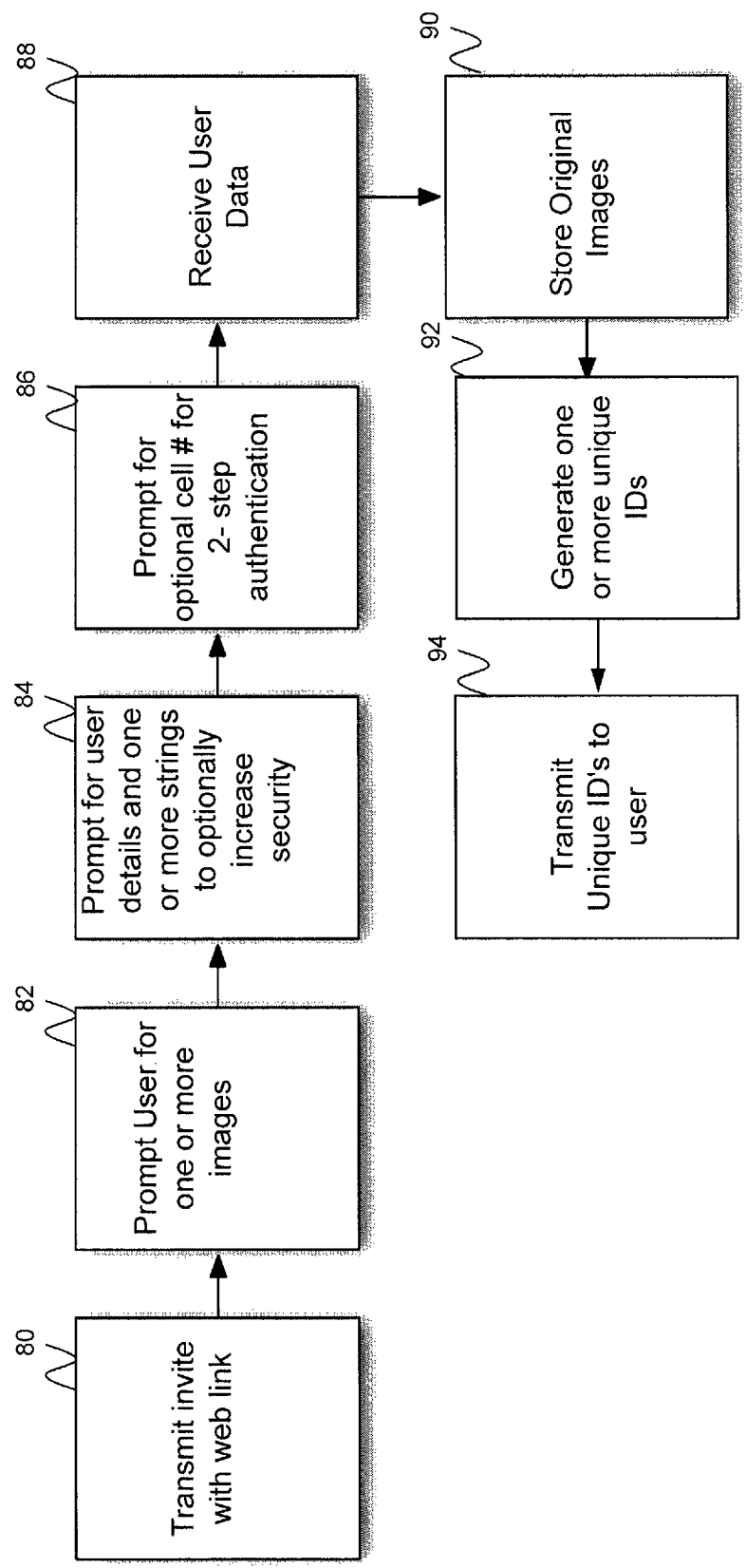
FIG. 2 is a flow diagram of a process for creating a unique ID according to one embodiment of the invention.

FIG. 2 is a flow diagram of a process for creating a unique ID according to one embodiment of the invention. The process may be initiated by an administrator of a business associated with, for example, the customer server 12. The business may create accounts for groups, employees, contractors and their customers (hereinafter "end users") depending on the services and resources they are sharing. In order for such customers to access the shared services and resources, unique IDs are created for each end user.

The process starts, and in act 80, the end user receives an invitation from the customer server 12 to create an account. The invitation may be, for example, an email or text message including a URL link. Upon actuating the URL link, the end user device 16 may be directed to a front end process running on the authentication server 10. The front end process may interact with the end user to prompt the end user, in act 82, for one or more images that the user wants to use as his unique ID's. The user may select, for example, one or more photographs stored on the end user device 16.

In act 84, the front end process may also prompt the end user for the user's personal or sensitive data, such as, for example, the end user's name, birthdate, driver's license number, social security number, user ID, password, secret questions/answers, credit card number, phone number, or the like, that is to be embedded into the image. Optionally in act 84, the front end process also prompts the end user to provide one or more alphanumeric strings. The strings provided by the end user may be, for example, random strings or phrases selected by the end user. According to one embodiment, the random strings or phrases provided by the end user allow for increased entropy (randomness or unpredictability) for the code within the unique ID.

In act 86, the front end process may also prompt the end user to optionally enter his cell phone number for a 2-step authentication process. During such 2-step authentication process, the user is prompted via a message on his cell phone (or other electronic device) to enter a second authentication factor such as, for example, a security code sent by SMS/Text or a verification code generated by a code generating application running on the user's cell phone or another electronic device.

In act 88, the front end process receives all data provided by the user and forwards the data to the unique ID generating module 22. According to one embodiment, the end user device 16 transmits the data securely (e.g. over a secure data communications link).

In act 90, the front end process saves the original image(s) received from the user in the mass storage device 26, in association with, for example, a portion of the received user data.

In act 92, the unique ID generating module 22 generates one or more unique IDs based on the received images and user data. According to one embodiment, the unique ID generating module 22 generates three unique IDs. The first unique ID is generated as a single-use ID. Such a unique ID may be selected to be used when the end-user device is accessing the customer server 12 from a public setting where he may be concerned with lack of privacy or the possibility that the unique ID may be compromised by the environment. According to one embodiment, the single-use unique ID is configured to expire after the first use.

The second unique ID is generated as a duress unique ID to be used during a duress situation. Such a unique ID may be selected to be used when the end-user is compromised or at risk of fraud or physical harm and needs to access the customer server 12 to maintain his or her safety. According to one embodiment, the duress unique ID is configured to trigger certain defensive actions such as, for example, sending a pre-written alert message by SMS/Text, email or wearable technology (ie, Apple Watch, Google Glass, or the like) to a pre-selected recipient (such as an IT manager or security officer and/or family member), as well as optionally triggering a defense mechanism by the authentication server 10 that may, among other things, notify administrators, limit data visibility, erase data or disable the account.

The third unique ID is generated as a regular use unique ID. This unique ID is intended to be used during situations other than single-use and duress.

In act 94, the generated unique IDs are transmitted to the user via electronic delivery, such as, for example, email, or via a physical a medium, such as, for example, a disk, flash drive, or the like.

Figure 3:
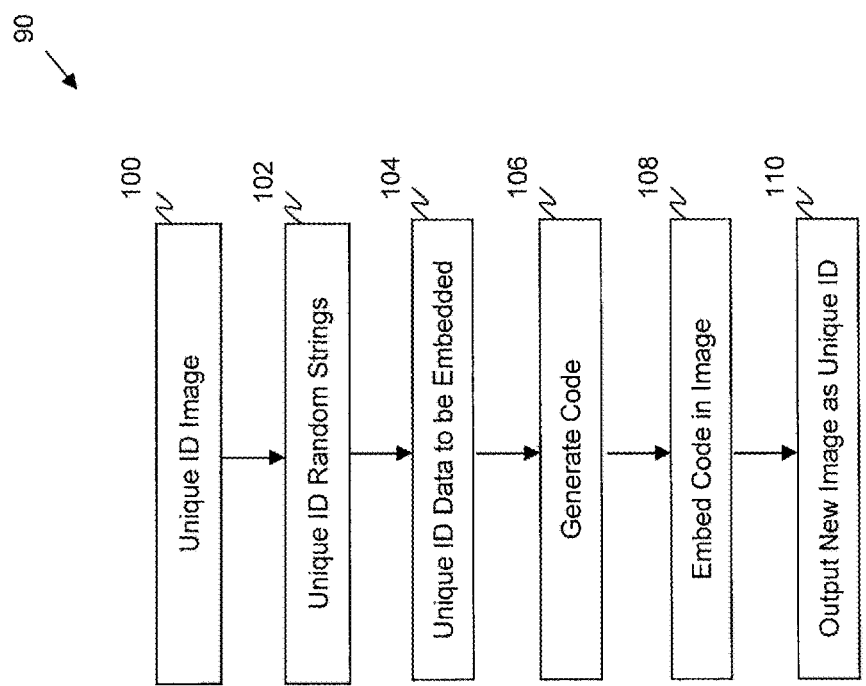
FIG. 3 is a more detailed flow diagram of an act for generating a unique ID according to one embodiment of the invention.

FIG. 3 is a more detailed flow diagram of act 90 for generating a unique ID according to one embodiment of the invention. In act 100, the ID generating module 22 identifies a received image to be used for the unique ID.

In act 102, the unique ID generating module 22 identifies any random strings provided by the end user.

In act 104, the unique ID generating module 22 identifies data to be embedded for the end user. Such data may be, for example, part of the user data provided by the user in act 84 (FIG. 2). In other embodiments, the data is one that is automatically generated by the system (e.g. randomly generated text or numbers). Different data is embedded depending on whether the type of unique ID that is being generated is a single-use ID, regular-use ID, or duress ID. The image that is used, however, may be the same. In other embodiments, different images may be used depending on the type of unique ID that is generated.

In act 106, the unique ID generating module 22 generates a code for being embedded in the image as the user's unique identification code. According to one embodiment, the unique ID generating module 22 uses the random strings identified in act 102, as a seed value for encrypting the data and generating the code. According to one embodiment, certain properties of the image in which the code is to be embedded are also used in the encryption algorithm to strengthen the encryption. Such properties may include, for example, size of the image, time in which the image was generated, and the like. The encrypted code is stored in the mass storage device 26 in association with the original image and user data.

In step 108, the unique ID generating module 22 embeds the code into the identified image. In this regard, the unique ID generating module 22 identifies unused or insignificant bits of the image. The insignificant or unused bits may be, for example, hidden or invisible layers or color channels inside an image. Changes to these bits are undetectable to the naked eye because they are not used in the visual depiction/rendering of the image. Once the unused or insignificant bits are identified, the identified bits are used to store portions of the code. The code, therefore, is distributed throughout the identified unused bits of the image. In this regard, the image acts as a vessel for concealing the code. The stored code does not create any noticeable visual alterations to the image. To the naked eye, the image that contains the code is no different than the image that does not contain the code.

In step 110, the unique ID generating module 22 outputs the modified image containing the concealed code as the unique ID for the user.

Figure 4A:
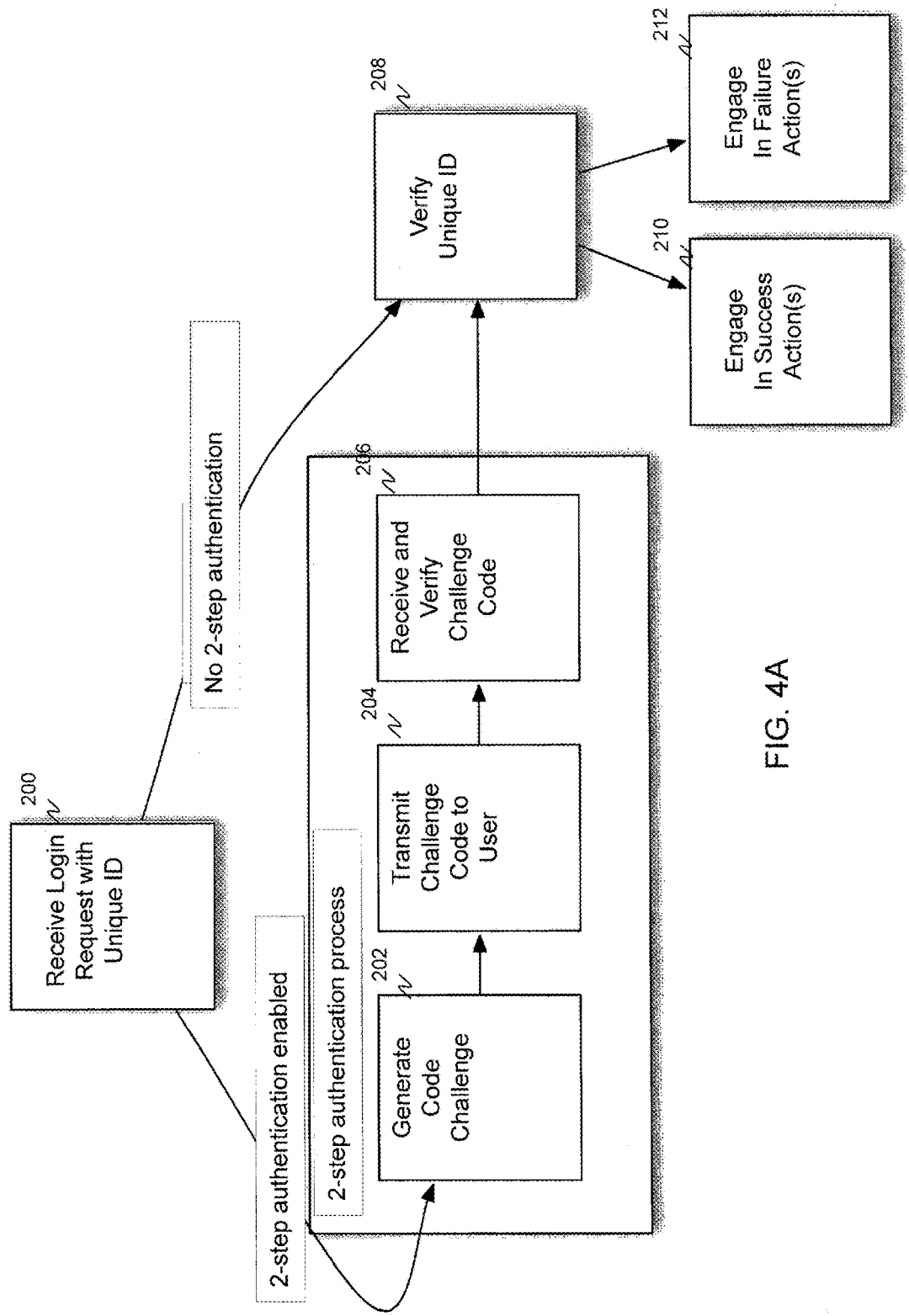
FIG. 4A is a flow diagram of a process for authenticating a user based on a submitted unique ID according to one embodiment of the invention.

FIG. 4A is a flow diagram of a process executed by the unique ID processing module 22 for authenticating a user based on a submitted unique ID according to one embodiment of the invention. According to one embodiment, the end user device 16 interacts with the HTTP software 18 to fill out a login form. The login form may prompt the user to provide, at a minimum, a single unique ID. Once filled, the login form (also referred to as a request) is forwarded by the HTTP software 18 to the unique ID processing module 24.

In act 200, the unique ID processing module 24 receives the login form including a unique ID. According to one embodiment, the unique ID is accompanied with information specific to the customer server 12 transmitting the request, such as, for example, a client ID and/or client key (collectively referred to as client credentials) unique to the particular customer server. In act 200, the unique ID processing module 24 identifies a particular user to which the unique ID is associated. This may be done, for example, based on information provided in the login form, based on the unique ID that is provided, and or the like.

In response to receipt of the login form and identification of the particular user, the unique ID processing module 22 determines whether a 2-step authentication process has been enabled for the particular user. The 2-step authentication process is deemed to be enabled if, for example, the user submitted a cell phone number in step 86 of FIG. 2.

If the 2-step authentication process has been enabled, the unique ID processing module 22 proceeds generate a code challenge in act 202. For example, a random code may be generated and texted to the user-provided cell phone number. The HTTP software 18 requests the user to enter the code they received, and then the code is sent to the API module 20 for additional authentication before proceeding to the customer's site.

In act 204, the unique ID processing module 22 transmits the generated code challenge to the user's cell phone. The user may be prompted to respond to the received message with the same code challenge to verify that the user transmitting the login request is the user that is associated with the cell phone.

In act 206, the unique ID processing module 22 receives and verifies the challenge code.

In act 208, the unique ID processing module 22 proceeds to verify the unique ID received with the login request. According to one embodiment, a first check of the verification process is to determine whether the expected customer ID and/or key were received with the request. A failure to receive such client credentials is indicative that the request was not transmitted by the customer server 12, but transmitted by an unauthorized system, and the authentication will fail.

If the correct client credentials have been received, the unique ID processing module 22 proceeds to verify the unique ID. In this regard, the unique ID processing module 22 retrieves the original image stored in the mass storage device 26 and compares the received image against the image that is retrieved. According to one embodiment, the comparison outputs differences between the original image and the received image. The differences are then compared against the stored encrypted code.

As discussed above, three different types of codes may be stored for a user: single-use code, regular-use code, and duress code. A comparison is made against each stored code to determine a match. If a match is not made against one of the codes, authentication fails, and the unique ID processing module 24 transmits a failure action URL to the end-user device 16 in act 212. The URL may, according to one embodiment, be a link to a random website with no association to the customer server 12. Other actions such as display of error messages and the like are also contemplated as will be appreciated by a person of skill in the art.

If there is a match of the embedded code against one of the stored codes, a success action URL is transmitted to the end-user device 16 in act 210. The type of success action to be invoked via the URL depends on the type of unique ID type that was received. For example, if a single-use unique ID was received, the unique ID processing module 24 disqualifies that unique ID from being re-used again. In addition, the unique ID generating module 22 issues a new unique ID by generating and embedding a new code, and transmits the unique ID to the user. According to one embodiment, the automatically deactivating of the received unique ID and reissuing a replacement unique ID can be done manually or automatically without a specific request from the user. Also, according to one embodiment, the replacement unique ID uses the same image that is used by the previous unique ID. However, the embedded code in the image differs from the code that was embedded in the received image.

If a match is made against a duress unique ID, the unique ID processing module 24 responds with a scalable response based on the threat to the user. The automated behavior may be configured by the administrator of the customer server 12. For example, the administrator may configure the automated behavior to be to send an email, SMS/text, alert or the like to a designated email address, phone number, wearable technology, or the like. In other examples, the behavior may be to disable access for other users, limit the availability of data, or display an error screen during login designed to convince the perpetrator that the site is currently unavailable.

If a match is made against a regular use unique ID, the unique ID processing module 24 may respond by taking a success action such as, for example, retrieving user data stored in association with the received code, and forwarding the user data to the customer server 12 via the API module 20. In this embodiment, it is assumed that the code itself does not contain the user data, but the user data is stored in the mass storage device in association with the code. In other embodiments, the success action may be giving access to resources of the customer server 12, completing a purchase transaction using the user data, and the like.

Figure 4B:
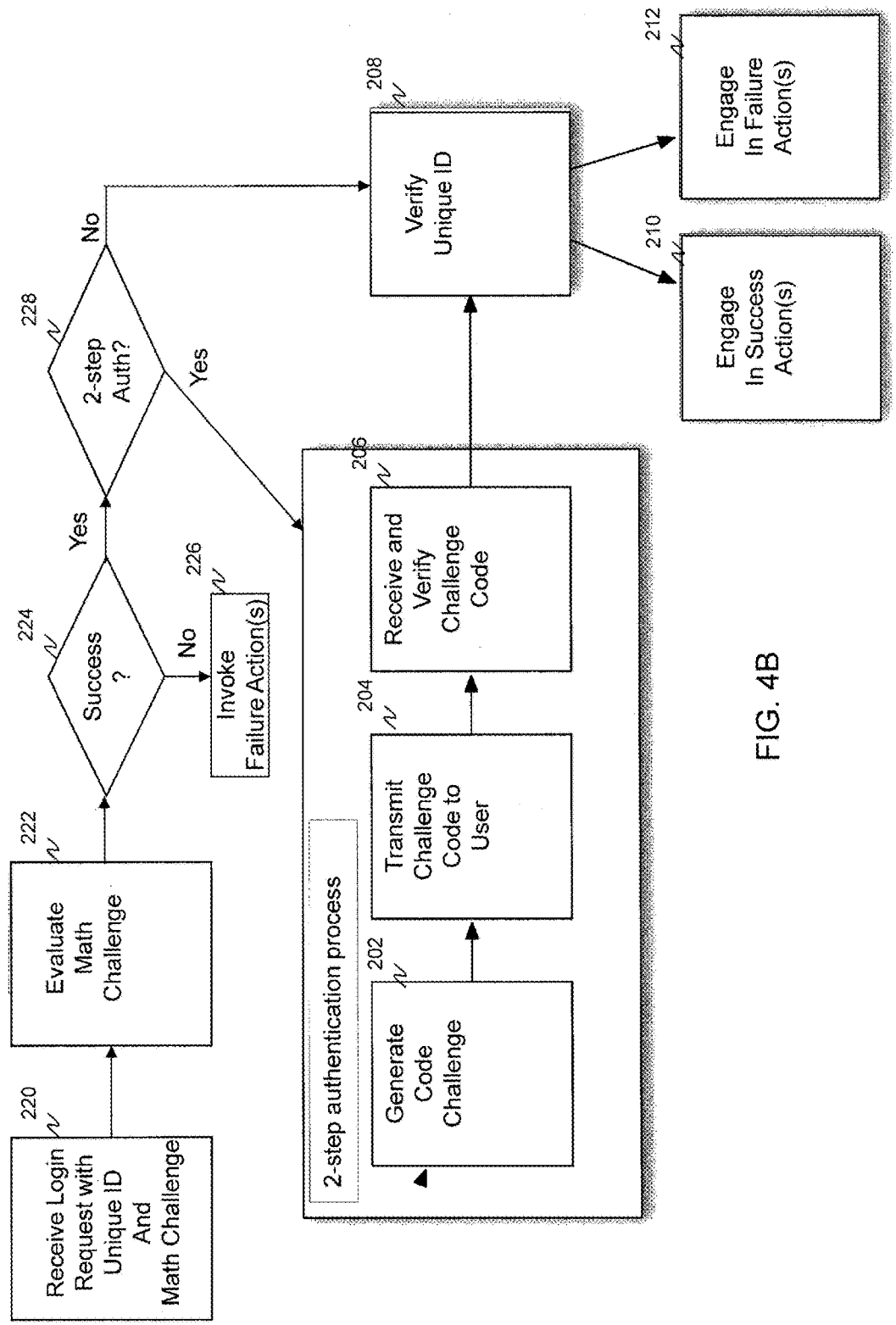
FIG. 4B is a flow diagram of a process for authenticating a user based on a submitted unique ID according to another embodiment of the invention.

FIG. 4B is a flow diagram of a process executed by the unique ID processing module 22 for authenticating a user based on a submitted unique ID according to another embodiment of the invention. The process of FIG. 4B is similar to the process of FIG. 4A, except that the login form provided by the customer server 12 also includes a math challenge that a user is to solve in order to proceed with the authentication process. The math challenge may be a simple math problem which changes each time the login form is accessed. For example, the math challenge may prompt the user to provide an answer to the following math problem: 11+22.

In act 222, the unique ID processing module 24 (or some other module of the authentication server 10) evaluates the math challenge to determine if the correct answer has been provided within an allotted time. If the challenge is completed successfully by receiving from the user the expected value within the allotted time, as determined in act 224, the authentication process proceeds to check for 2-step authentication in act 228, similar to what is described in FIG. 4A.

If, however, the math challenge is not completed successfully, one or more failure actions are invoked in act 226. In this regard, failures may be treated the same as if the user were entering the wrong password. For example, a certain number of failed attempts may lockout the user, the user's device, or even permanently blacklist the user and/or device from further login attempts.

According to one embodiment, the login form that is submitted to the unique ID processing module for authentication differs from login forms that are typically transmitted in the art. FIG. 5A illustrates code for generating a typical HTML login form according to existing mechanisms. As depicted in FIG. 5A, the login form prompts and expects a username or password values in the corresponding username and password fields.

Figure 5B:
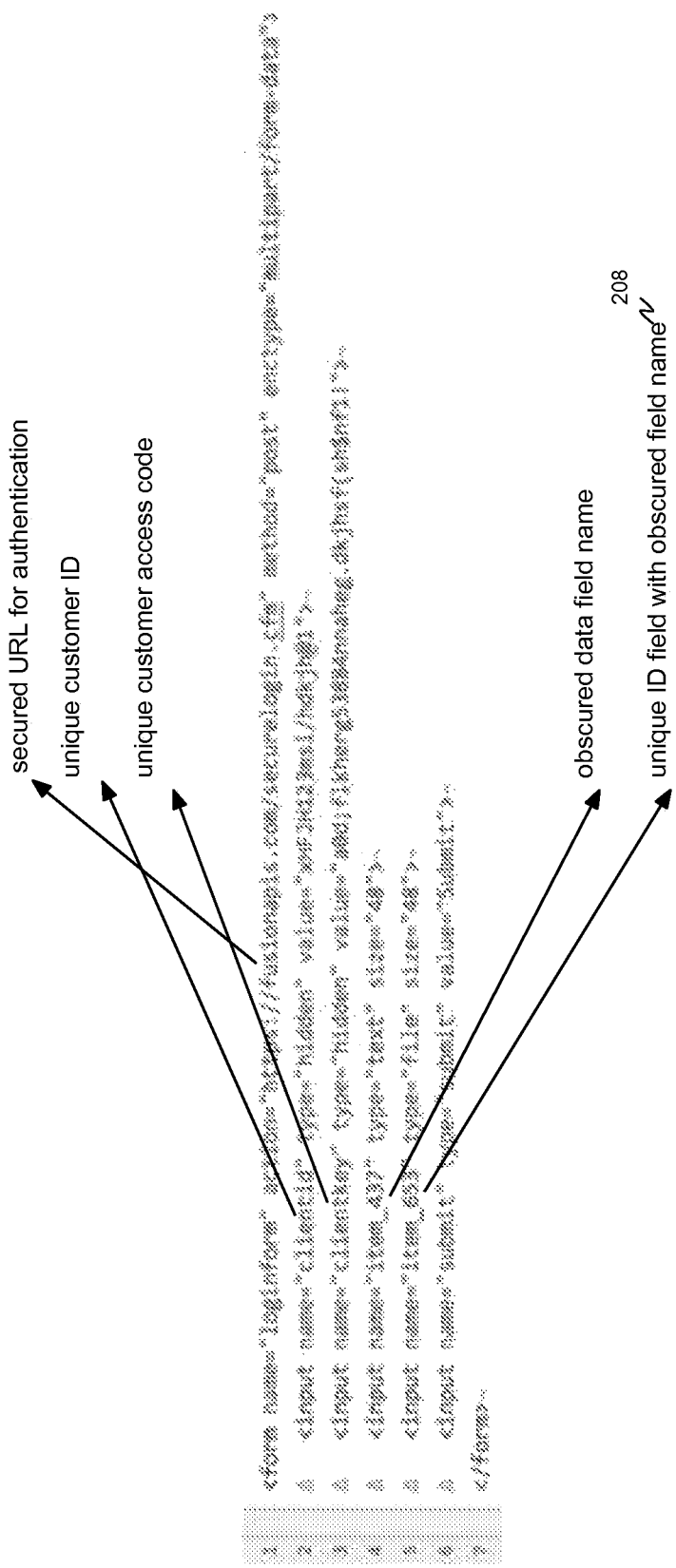
FIG. 5B illustrates code for generating a login form according to embodiments of the present invention.

FIG. 5B illustrates code for generating a login form according to embodiments of the present invention. According to the illustrated embodiment, a "file" field 208 prompts for a MIME value containing bit data (image data) that makes up the unique ID. The MIME data is interpreted by an "action" page and saved as a photo in the mass storage device 26 where it can be validated during the authentication process.

Figure 6:
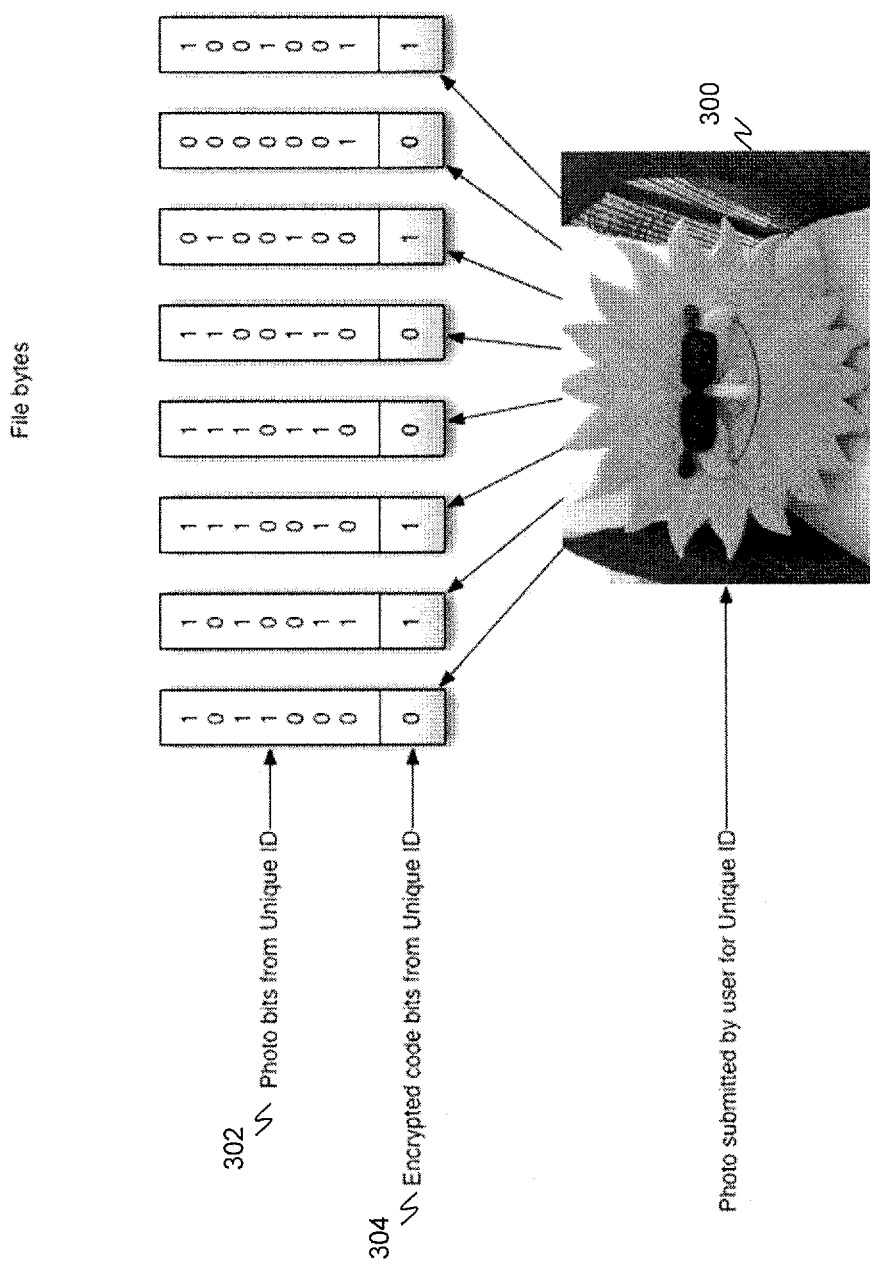
FIG. 6 is a schematic layout diagram of a unique ID 300 according to one embodiment of the invention.

FIG. 6 is a schematic layout diagram of a unique ID 300 according to one embodiment of the invention. The unique ID 300 is composed of image bits 302 and encrypted code bits 304. The image bits 302 together form the image, which, in this example, is an image of a sun wearing sunglasses. As a person of skill in the art will appreciate, each time a photo of an object is taken, the image bits 302 making up the image differ for each instance of the photo even if the subject of the photo remains the same. This is due to the varying circumstances surrounding the taking of the photo. For example, the lighting, position of the object, position of the person taking the photo, and the like, may differ for each instance the photo is taken, resulting in differences in the image bits 302.

The encrypted code bits 304 that are embedded in the image together form a code that is used for identifying a user. The bits of the code are spread out over various bytes of the image file, taking up unused or insignificant bits of those bytes. In the illustrated example, the encrypted code is "01100101."

According to one embodiment, the authentication server 10 acts as a gatekeeper for e-commerce systems, protecting and authenticating end users during checkout of an online purchase. In this regard, the server 10 may handle the basic user authentication for accessing user records stored on the customer server 12, or store the end user data on behalf of the customer server and provide the data to the customer server upon successful authentication of the end user. According to one embodiment, each time the unique ID is used on an e-commerce site, the authentication server automatically retires the unique ID and issues a new unique ID, which prevents fraudulent transactions and/or ID theft.

According to one embodiment, the end user data is stored at an e-commerce/merchant site (e.g. the customer server 12), but the authentication server 10 authenticates the end-user with his unique ID instead of a user name and password. The name or username of the shopper is not stored in the e-commerce/merchant server. Instead, the e-commerce site stores an account number or account identifier in association with the payment data. Upon successful authentication of the end-user by the authentication server 10, the server provides the e-commerce site with the user's account ID so that the e-commerce site knows which payment and/or shipping details to access. This process maintains consistent protection of the users' identifying information so that the e-commerce site stores, according to one embodiment, credit card data, address, shopping cart identifier, and the like, but does not store personal identification information of the users including a user name and/or password.

According to another embodiment of the invention, the name or username of a user along with the user's credit card data and address are encrypted and stored in the mass storage device 26. This information is passed to the e-commerce site upon successful authentication of the end-user. This helps prevent the storage of sensitive data on the merchant's server which may be subject to hacking by unauthorized users.

According to yet another embodiment, the authentication server provides merchant services in addition to authentication services. According to this embodiment, the e-commerce site makes a transaction request, and the authentication server approves or disapproves the transaction. The e-commerce site merely stores the shopping cart data and forwards such data to the authentication sever for approval or disapproval. User identification information, credit card information, address, and the like, are securely stored in the mass storage device 26.

It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive.

The invention claimed is:

1. A method, performed by a system having one or more processors and one or more memory devices, for generating and utilizing an image as a unique identifier for a user, the method comprising:
  generating, by the one or more processors, an image identifier for a user, including:
    receiving a digital image transmitted by a user device;
    storing the digital image in a first data storage device in association with the user, the first data storage device storing a plurality of other digital images for a plurality of other users;
    identifying a first code, wherein the first code is at least one of personal information of the user, or a number or text generated by the one or more processors;
    storing the first code in association with the user;
    embedding the first code into the received digital image and generating the image identifier in response;
    transmitting the image identifier to the user for storing in a second data storage device different from the first storage device; and
  making an authentication determination, by the one or more processors, based on the image identifier, including:

receiving, from the user, the image identifier and information associated with the user for identifying the user, wherein the information associated with the user is at least one of a user identifier, key, or login form;

locating the digital image among the plurality of other digital images in the first data storage device using the received information;

retrieving the located digital image from the first storage device;

comparing the received image identifier against the retrieved digital image;

outputting, based on the comparing, a difference between the received image identifier and the retrieved digital image, wherein the difference is the embedded first code;

comparing the embedded first code against the first code stored in association with the user; and generating a success signal in response to a match of the embedded first code against the first code stored in association with the user.

2. The method of claim 1, wherein the image identifier is stored in an end user device accessible to the user.

3. The method of claim 1, wherein the personal information is at least one of address, telephone number, birthdate, name, driver license number, social security number, credit card number, user identifier, password, or a randomly generated code.

4. The method of claim 1 further comprising:
encrypting the first code based on properties of the received digital image, wherein the first code embedded into the digital image is the encrypted first code.

5. The method of claim 1, wherein the embedding includes identifying one or more bits of the digital image that are not used in creating a visual depiction of the digital image, and
storing the first code in the identified one or more bits.

6. The method of claim 1, wherein the authenticating further
includes:
transmitting a security code to a telephone number associated with the user; and
verifying the transmitted security code against a security code received from the telephone number.

7. The method of claim 1, wherein the authenticating further
includes:
receiving an answer to a math problem provided by the user; determining whether the answer is correct; and
in response to determining that the answer is incorrect, taking a failure action.

8. The method of claim 1, wherein the success signal is for at least authenticating the user, disqualifying the first code for being used again, transmitting a notification, retrieving user data, giving the user access to resources, completing a transaction, or taking a preset action.

9. The method of claim 1, wherein the image identifier is configured to expire after a preset number of uses in making an authentication determination.

10. The method of claim 1 further comprising:
generating a failure signal in response to a failed match of the difference against the first code; and
transmitting a message in response to the failure signal.

11. The method of claim 1 further comprising:
transmitting an alert or notification in response to the success signal, wherein the alert or notification is indicative of a circumstance involving the user.

12. The method of claim 11, wherein the circumstance includes a duress situation or other situations involving the user.

13. A system for generating and utilizing an image as a unique
identifier for a user, the system comprising:
one or more processors; and
one or more memory devices, wherein the one or more memory devices have stored therein instructions that, when executed by the one or more processors, respectively cause the one or more processors to:
generate an image identifier for a user, including:
receive a digital image transmitted by a user device;
store the digital image in a first data storage device in association with the user, the first data storage device storing a plurality of other digital images for a plurality of other users;
identify a first code, wherein the first code is at least one of personal information of the user, or a number or text generated by the one or more processors;
store the first code in association with the user;
embed the first code into the received digital image and generate the image identifier in response;
transmit the image identifier to the user for storing in a second data storage device different from the first storage device; and
make an authentication determination based on the image identifier, including:
receive, from the user, the image identifier and information associated with the user for identifying the user, wherein the information associated with the user is at least one of a user identifier, key, or login form;
locate the digital image among the plurality of other digital images in the first data storage device using the received information;
retrieve the located digital image from the first storage device;
compare the received image identifier against the retrieved digital image;
output, based on the comparing, a difference between the received image identifier and the retrieved digital image, wherein the difference is the embedded first code;
compare the embedded first code against the first code stored in association with the user; and
generate a success signal in response to a match of the embedded first code against the first code stored in association with the user.

14. The system of claim 13, wherein the instructions respectively cause the one or more processors to:
generate a failure signal in response to a failed match of the difference against the first code; and transmit a message in response to the failure signal.

15. The system of claim 13, wherein the instructions respectively cause the one or more processors to:
transmit an alert or notification in response to the success signal, wherein the alert or notification is indicative of a circumstance involving the user.

16. The system of claim 15, wherein the circumstance includes a duress situation or other situations involving the user.

* * * * *